United States Patent
Wang et al.

(10) Patent No.: US 12,055,457 B2
(45) Date of Patent: Aug. 6, 2024

(54) TOOTH VIBRATION SIMULATION TEST SYSTEM FOR DUAL MACHINE DRIVE GEAR TRANSMISSION DEVICE

(71) Applicant: NO.703 Research Institute of CSSC, Harbin (CN)

(72) Inventors: Xin Wang, Harbin (CN); Songtao Zhao, Harbin (CN); Yuting Jiang, Harbin (CN); Long Yang, Harbin (CN); Lidong Jiang, Harbin (CN); Guanghao Dai, Harbin (CN); Yue Wu, Harbin (CN); Bozhao Ma, Harbin (CN); Shengjian Ye, Harbin (CN); Jian Zhang, Harbin (CN)

( * ) Notice: Subject to any disclaimer, the term of this patent is extended or adjusted under 35 U.S.C. 154(b) by 0 days.

(21) Appl. No.: 18/522,218

(22) Filed: Nov. 28, 2023

(65) Prior Publication Data
US 2024/0175781 A1     May 30, 2024

(30) Foreign Application Priority Data
Nov. 29, 2022 (CN) .......................... 202211517022.6

(51) Int. Cl.
     *G01M 13/025*      (2019.01)
(52) U.S. Cl.
     CPC ................................. *G01M 13/025* (2013.01)
(58) Field of Classification Search
     CPC .................................................... G01M 13/025
     See application file for complete search history.

(56) References Cited

U.S. PATENT DOCUMENTS

| | | | |
|---|---|---|---|
| 2023/0391205 A1* | 12/2023 | Oh | B60L 15/20 |
| 2023/0391339 A1* | 12/2023 | Oh | B60Q 9/00 |
| 2023/0395059 A1* | 12/2023 | Oh | B60L 15/20 |

FOREIGN PATENT DOCUMENTS

| | | |
|---|---|---|
| CN | 202420847 U | 9/2012 |
| CN | 207114175 U | 3/2018 |
| CN | 113295405 A | 8/2021 |
| CN | 114216675 A | 3/2022 |
| WO | 2018121172 A1 | 7/2018 |

\* cited by examiner

*Primary Examiner* — Eric S. McCall
(74) *Attorney, Agent, or Firm* — Novoclaims Patent Services LLC; Mei Lin Wong

(57) ABSTRACT

A tooth vibration simulation test system to solve the problem of failure to simulate a tooth vibration of the dual-machine parallel drive gear transmission device and being used in tooth vibration simulation testing, includes a first and a second driving units, a transmission shaft assembly, a servo motor controller, a gear transmission device, a loading shaft, a load dynamometer and a load dynamometer control device. The power output of the first driving unit and the second driving unit are both connected to inputs of the gear transmission device, a power output of the gear transmission device is connected to one end of the loading shaft, another end of the loading shaft is connected to a power input shaft of the load dynamometer through the transmission shaft assembly, a signal input terminal of the load dynamometer is connected to a signal output terminal of the load dynamometer controller.

3 Claims, 3 Drawing Sheets

TOOTH VIBRATION SIMULATION TEST SYSTEM FOR DUAL MACHINE DRIVE GEAR TRANSMISSION DEVICE

FIELD OF INVENTION

The present invention relates to a tooth vibration simulation test system, and specifically relates to a tooth vibration simulation test system for a dual machine drive gear transmission device.

DESCRIPTION OF RELATED ARTS

The dual-machine driven gear transmission is used to integrate and transmit the output power of the two power sources to the propulsion shaft system to increase the output power of the propulsion system. The dual-machine drive gear transmission is used to integrate and transmit the output power of the two power sources to the propulsion shaft system to increase the output power of the propulsion system. Due to the existence of the tooth side clearance of the gear transmission device, when the parallel vehicle is running and the driving end gear pair of the parallel vehicle changes from negative meshing to positive meshing, the gear pair will repeatedly knock in the tooth side gap, resulting in severe noise and vibration. After the completion of dual-machine driving and paralleling, and the input of effective power, the tooth vibration phenomenon will disappear. The tooth-beating vibration of the gear transmission device will aggravate gear fatigue and wear, prone to cracks, broken teeth and other faults, and even cause damage to the power system, seriously threatening the safety and reliability of the system.

The tooth vibration simulation test system for dual-machine driven gear transmission gear can effectively reproduce the tooth vibration phenomenon of the actual gear transmission device. The tooth vibration of the dual-machine drive gear transmission is affected by various factors such as dual-machine drive power changes, input-end torque fluctuations, and output-end load torque fluctuations. Through simulation test studies, the influence rules of the above factors on tooth vibration can be given, providing effective technical support for reducing the negative impact of tooth vibration.

In view of the problem of tooth vibration of the dual-machine parallel drive gear transmission device, the existing technology lacks a tooth vibration simulation test system for this type of device, which fails to reproduce the actual tooth vibration phenomenon and verify the influence of various influencing factors on the tooth vibration, and therefore unable to provide effective solutions to avoid tooth vibration problems.

SUMMARY OF THE PRESENT INVENTION

An object of the present invention is to solve the problems in the existing technology that fails to simulate the tooth vibration of the actual dual-machine parallel gear transmission, and to provide a tooth vibration simulation test system for a dual machine drive gear transmission device.

The tooth vibration simulation test system for a dual machine drive gear transmission device, the simulation test system comprises: a first driving unit, a second driving unit, a transmission shaft assembly, a servo motor controller, a gear transmission device, a loading shaft, a load dynamometer and a load dynamometer control device, wherein the first driving unit and the second driving unit are arranged in parallel, a power output end of the first driving unit is connected to a first power input end of the gear transmission device through a shaft coupling device, a power driving end of the first driving unit is connected to a first signal output terminal of the servo motor controller through a connecting wire, a power output end of the second driving unit is connected to a second power input end of the gear transmission device through a shaft coupling device, a power driving end of the second driving unit is connected to a second signal output terminal of the servo motor controller through a connecting wire, and a power output end of the gear transmission device is connected to one end of the loading shaft through a shaft coupling device, another end of the loading shaft is connected to a power input shaft of the load dynamometer through the transmission shaft assembly, a signal input terminal of the load dynamometer is connected to a signal output terminal of the load dynamometer controller through a connecting wire.

Furthermore, the first driving unit comprises a first driving servo motor, a first driving torque sensor and a first intermediate shaft, the first driving servo motor is fixed on a ground through a motor supporting frame, a motor output shaft of the first driving servo motor is detachably connected to one end of the first intermediate shaft, another end of the first intermediate shaft is connected to a first power input end of the gear transmission device through a shaft coupling device, the first driving torque sensor is installed on the first intermediate shaft, and the first driving torque sensor is fixed on the ground through a supporting frame.

Furthermore, the second driving unit comprises a second driving servo motor, a second driving torque sensor and a second intermediate shaft, the second driving servo motor is fixed on the ground through a motor supporting frame, a motor output shaft of the second driving servo motor is detachably connected to one end of the second intermediate shaft, another end of the second intermediate shaft is connected to a second power input end of the gear transmission device through a shaft coupling device, the second driving torque sensor is installed on the second intermediate shaft, and the second driving torque sensor is fixed on the ground through a supporting frame.

Furthermore, the transmission shaft assembly comprises a transmission shaft and a loading torque sensor, one end of the transmission shaft is detachably connected to another end of the loading shaft, and another end of the transmission shaft is detachably connected to a power input shaft in the load dynamometer, the loading torque sensor is installed on the transmission shaft, and the loading torque sensor is fixed on the ground through a supporting frame.

Furthermore, the gear transmission device is internally provided with a first main driving shaft unit, a first driven shaft unit, a second main driving shaft unit, a second driven shaft unit and an output shaft unit, the first main driving shaft unit and the second main driving shaft unit are symmetrically arranged on two sides of the output shaft unit along an axis of the output shaft unit, the first driven shaft unit is arranged between the first main driving shaft unit and the output shaft unit, and the first main driving shaft unit is transmission connected to the output shaft unit through the first driven shaft unit, the second driven shaft unit is arranged between the second main driving shaft unit and the output shaft unit, and the second main driving shaft unit is transmission connected to the output shaft unit through the second driven shaft unit, another end of the first intermediate shaft is connected to the first main driving shaft unit in the gear transmission device through a shaft coupling device, another end of the second intermediate shaft is connected to the second main driving shaft unit in the gear transmission device through a shaft coupling device.

Furthermore, the first main driving shaft unit comprises a first main driving shaft and a first main driving gear, the first main driving gear is installed on the first main driving shaft, the first driven shaft unit comprises a first driven shaft, a first driven gear and a second driven gear, the first driven gear and the second driven gear are both installed on the first driven shaft, and teeth of the first main driving gear of the first driven gear are arranged to mesh with each other, the output shaft unit comprises an output shaft and an output gear, the output gear is installed on the output shaft, and teeth of the second driven gear are arranged to mesh with each other, the second driven shaft unit comprises a second driven shaft, a third driven gear and a fourth driven gear, the third driven gear and the fourth driven gear are both installed on the second driven shaft, and teeth of the fourth driven gear and the output gear are arranged to mesh with each other, the second main driving shaft unit comprises a second main driving shaft and a second main driving gear, the second main driving gear is installed on the second main driving shaft, and teeth of the second main driving gear and the third driven gear are arranged to mesh with each other, another end of the first intermediate shaft is connected to the first main driving shaft through a shaft coupling device, and another end of the second intermediate shaft is connected to the second driving shaft through a shaft coupling device.

Preferably, the first driving servo motor is in a rotating speed mode and the second driving servo motor is in a torque mode, during operation of the system, first, the first driving servo motor is started and is given a preset speed so as to drive the second driving servo motor and the load dynamometer to run such that at this point, the gear pair connected to the second driving servo motor is in a negative meshing state and no work is done on the gear transmission device and the load; then, the second driving servo motor starts and gradually increases an output torque of the motor, and during this process, the gear pair connected to the second driving servo motor changes from a negative meshing state to a positive meshing state, and tooth vibration occurs; lastly, the second driving motor continues to increase to an appropriate torque so that at this point, both the first and the second driving motors output effective power and the tooth vibration disappears, the servo motor controller provides a driving torque fluctuation control for the second driving servo motor, and the dynamometer controller provides a loading torque control for the dynamometer in order to realize an input torque fluctuation and a loading torque fluctuation of the vibration simulation test system for the dual-machine drive gear transmission device.

Compared with the existing technologies, the present invention has the following advantageous effects:

The present invention provides a tooth vibration simulation test system for a dual machine drive gear transmission device. The first driving servo motor is in rotating speed mode and the second driving servo motor is in torque mode. During the operation of the system, first the first driving servo motor is started and is given a preset speed, which drives the second driving servo motor and the load dynamometer to run. At this time, the gear pair connected to the second driving servo motor is in a negative meshing state and no work is done on the gear transmission device and the load. Next, the second driving servo motor starts and gradually increases the output torque of the motor. During this process, the gear pair connected to the second driving servo motor changes from a negative meshing state to a positive meshing state, and tooth vibration occurs. Finally, the second driving motor continues to increase to the appropriate torque. At this time, the first and the second driving motors output effective power and the beating vibration disappears. The servo motor controller can provide driving torque fluctuation control for the second driving servo motor, and the dynamometer controller can provide loading torque control for the dynamometer in order to realize the input torque fluctuation and loading torque fluctuation of the vibration simulation test system for the dual-machine drive gear transmission device. Through the obtained input torque fluctuation and loading torque fluctuation, the experimenter can provide solutions that can effectively avoid the beating teeth vibration problem.

Figure 1:
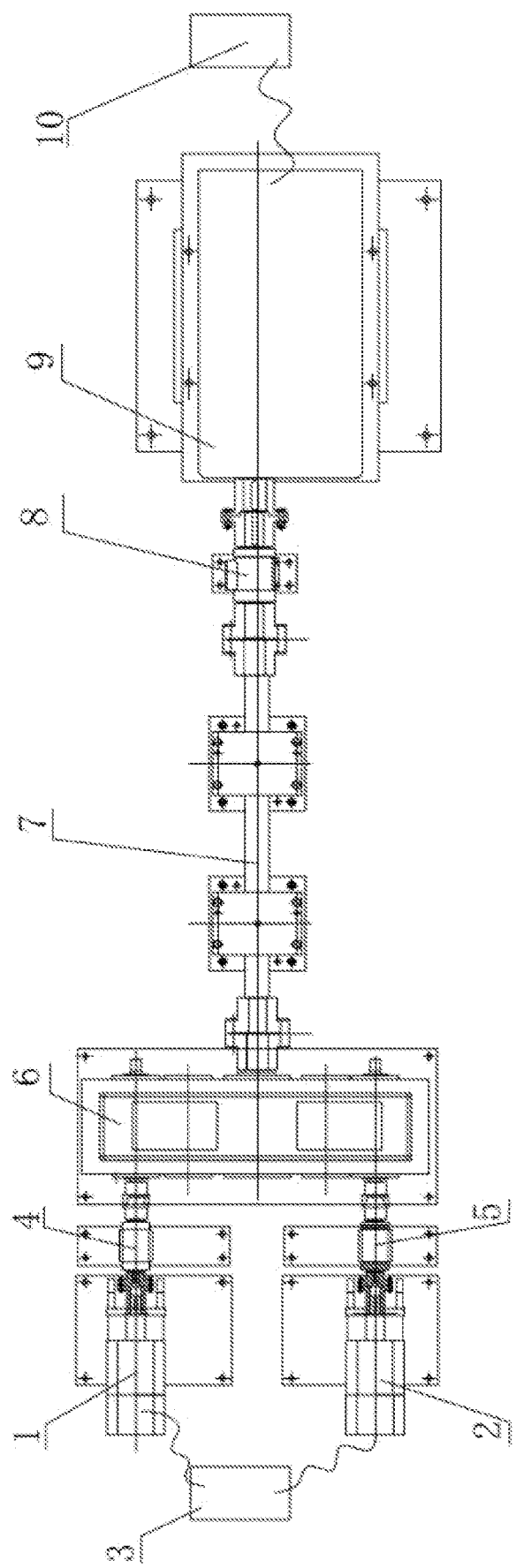
FIG. 1 is a top view of a tooth vibration simulation test system for a dual machine drive gear transmission device according to the present invention.

In the figures: 1 refers to a first driving servo motor, 2 refers to a second driving servo motor, 3 refers to a servo motor controller, 4 refers to a first driving torque sensor, 5 refers to a second driving torque sensor, 6 refers to a gear transmission device, 6-1 refers to a first main driving shaft, 6-1-1 refers to a first main driving gear, 6-2 refers to a first driven shaft, 6-2-1 refers to a first driven gear, 6-2-2 refers to a second driven gear, 6-3 refers to an output shaft, 6-3-1 refers to an output gear, 6-4 refers to a second driven shaft, 6-4-1 refers to a third driven gear, 6-4-2 refers to a fourth driven gear, 6-5 refers to a second main driving shaft, 6-5-1 refers to a second main driving gear, 7 is refers to a loading shaft, 8 refers to a loading torque sensor, 9 refers to a load dynamometer, 10 refers to a load dynamometer controller.

DETAILED DESCRIPTION OF THE PREFERRED EMBODIMENT

Preferred Embodiment 1: This embodiment is described below with reference to FIG. 1 to FIG. 3. According to this embodiment, a tooth vibration simulation test system for a dual machine drive gear transmission device is provided. The simulation test system comprises a first driving unit, a second driving unit, a transmission shaft assembly, a servo motor controller 3, a gear transmission device 6, a loading shaft 7, a load dynamometer 9 and a load dynamometer control device 10, wherein the first driving unit and the second driving unit are arranged in parallel, a power output end of the first driving unit is connected to a first power input end of the gear transmission device 6 through a shaft coupling device, a power driving end of the first driving unit is connected to a first signal output terminal of the servo motor controller 3 through a connecting wire, a power output end of the second driving unit is connected to a second power input end of the gear transmission device 6 through a shaft coupling device, a power driving end of the second driving unit is connected to a second signal output terminal of the servo motor controller 3 through a connecting wire, and a power output end of the gear transmission device 6 is connected to one end of the loading shaft 7 through a shaft coupling device, another end of the loading shaft 7 is connected to a power input shaft of the load dynamometer 9 through the transmission shaft assembly, a signal input terminal of the load dynamometer 9 is connected to a signal output terminal of the load dynamometer controller 10 through a connecting wire.

Preferred Embodiment 2: This embodiment is described below with reference to FIG. 1 to FIG. 3. The difference between this embodiment and Preferred Embodiment 1 is that: the first driving unit comprises a first driving servo motor 1, a first driving torque sensor 4 and a first intermediate shaft, the first driving servo motor 1 is fixed on a ground through a motor supporting frame, a motor output shaft of the first driving servo motor 1 is detachably connected to one end of the first intermediate shaft, another end of the first intermediate shaft is connected to a first power input end of the gear transmission device 6 through a shaft coupling device, the first driving torque sensor 4 is installed on the first intermediate shaft, and the first driving torque sensor 4 is fixed on the ground through a supporting frame. Other components and connection relationships are the same as the Preferred Embodiment 1.

According to this embodiment, a connecting sleeve is installed on the output shaft of the first driving servo motor 1. The end of the connecting sleeve is provided with a flange. The end face of the first intermediate shaft is also provided with a flange. The detachable connection of the output shaft of the first driving servo motor 1 to the first intermediate shaft is realized through the flange.

Preferred Embodiment 3: This embodiment is described below with reference to FIG. 1 to FIG. 3. The difference between this embodiment and Preferred Embodiment 2 is that: the second driving unit comprises a second driving servo motor 2, a second driving torque sensor 5 and a second intermediate shaft, the second driving servo motor 2 is fixed on the ground through a motor supporting frame, a motor output shaft of the second driving servo motor 2 is detachably connected to one end of the second intermediate shaft, another end of the second intermediate shaft is connected to a second power input end of the gear transmission device 6 through a shaft coupling device, the second driving torque sensor 5 is installed on the second intermediate shaft, and the second driving torque sensor 5 is fixed on the ground through a supporting frame. Other components and connection relationships are the same as the Preferred Embodiment 2.

According to this embodiment, the connection method of the second driving servo motor 2 and the second intermediate shaft is the same as the connection method of the first driving servo motor 1 and the first intermediate shaft.

Preferred Embodiment 4: This embodiment is described below with reference to FIG. 1 to FIG. 3. The difference between this embodiment and Preferred Embodiment 3 is that: the transmission shaft assembly comprises a transmission shaft and a loading torque sensor 8, one end of the transmission shaft is detachably connected to another end of the loading shaft 7, and another end of the transmission shaft is detachably connected to a power input shaft in the load dynamometer 9, the loading torque sensor 8 is installed on the transmission shaft, and the loading torque sensor 8 is fixed on the ground through a supporting frame. Other components and connection relationships are the same as the Preferred Embodiment 3.

According to this embodiment, the connecting end of the load shaft 7 and the transmission shaft are equipped with a flange, and both ends of the transmission shaft are also equipped with flanges. The loading shaft 7 is detachably connected to the transmission shaft through the flange.

Preferred Embodiment 5: This embodiment is described below with reference to FIG. 1 to FIG. 3. The difference between this embodiment and Preferred Embodiment 4 is that: the gear transmission device 6 is internally provided with a first main driving shaft unit, a first driven shaft unit, a second main driving shaft unit, a second driven shaft unit and an output shaft unit, the first main driving shaft unit and the second main driving shaft unit are symmetrically arranged on two sides of the output shaft unit along an axis of the output shaft unit, the first driven shaft unit is arranged between the first main driving shaft unit and the output shaft unit, and the first main driving shaft unit is transmission connected to the output shaft unit through the first driven shaft unit, the second driven shaft unit is arranged between the second main driving shaft unit and the output shaft unit, and the second main driving shaft unit is transmission connected to the output shaft unit through the second driven shaft unit, another end of the first intermediate shaft is connected to the first main driving shaft unit in the gear transmission device 6 through a shaft coupling device, another end of the second intermediate shaft is connected to the second main driving shaft unit in the gear transmission device 6 through a shaft coupling device. Other components and connection relationships are the same as the Preferred Embodiment 4.

Preferred Embodiment 6: This embodiment is described below with reference to FIG. 1 to FIG. 3. The difference between this embodiment and Preferred Embodiment 5 is that: the first main driving shaft unit comprises a first main driving shaft 6-1 and a first main driving gear 6-1-1, the first main driving gear 6-1-1 is installed on the first main driving shaft 6-1, the first driven shaft unit comprises a first driven shaft 6-2, a first driven gear 6-2-1 and a second driven gear 6-2-2, the first driven gear 6-2-1 and the second driven gear 6-2-2 are both installed on the first driven shaft 6-2, and teeth of the first main driving gear 6-1-1 of the first driven gear 6-2-1 are arranged to mesh with each other, the output shaft unit comprises an output shaft 6-3 and an output gear 6-3-1, the output gear 6-3-1 is installed on the output shaft 6-3, and teeth of the second driven gear 6-2-2 are arranged to mesh with each other, the second driven shaft unit comprises a second driven shaft 6-4, a third driven gear 6-4-1 and a fourth driven gear 6-4-2, the third driven gear 6-4-1 and the fourth driven gear 6-4-2 are both installed on the second driven shaft 6-4, and teeth of the fourth driven gear 6-4-2 and the output gear 6-3-1 are arranged to mesh with each other, the second main driving shaft unit comprises a second main driving shaft 6-5 and a second main driving gear 6-5-1, the second main driving gear 6-5-1 is installed on the second main driving shaft 6-5, and teeth of the second main driving gear 6-5-1 and the third driven gear 6-4-1 are arranged to mesh with each other, another end of the first intermediate shaft is connected to the first main driving shaft 6-1 through a shaft coupling device, and another end of the second intermediate shaft is connected to the second driving shaft 6-5 through a shaft coupling device. Other components and connection relationships are the Preferred Embodiment 5.

Although the present invention has been disclosed above in terms of preferred embodiments, this is not intended to limit the present invention. Those skilled in the art can also make other changes within the spirit of the present invention and apply it to fields not mentioned in the present invention. Of course, these changes made based on the spirit of the present invention should be included in the scope of protection claimed by the present invention.

Figure 2:
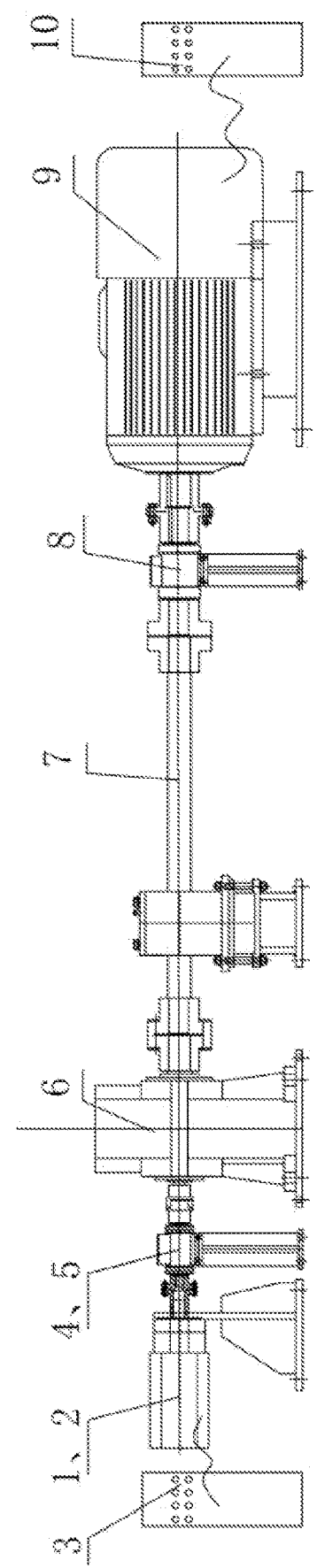
FIG. 2 is a front view of a tooth vibration simulation test system for a dual machine drive gear transmission device according to the present invention.
Figure 3:
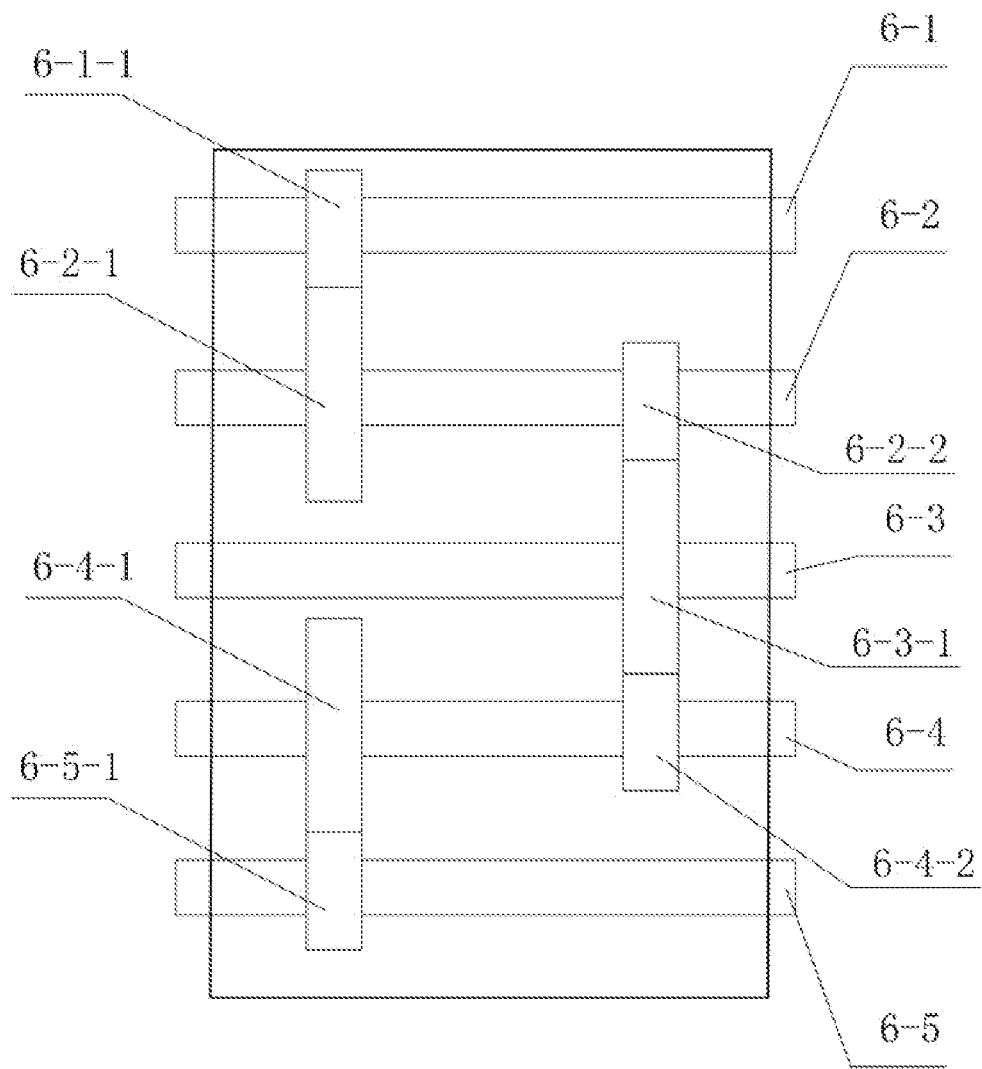
FIG. 3 is a schematic structural diagram a gear transmission device 6 according to the present invention.

Working Principle:

The working principle of the tooth vibration simulation test system for the dual-machine drive gear transmission device according to the present invention is explained with reference to FIG. 1 to FIG. 3:

First, according to the structural position of each component in FIG. 1 and FIG. 2, a dual-machine drive gear transmission device is connected to a vibration simulation test system, and the servo motor controller 3 is used to set the working mode of the first driving servo motor 1 to the rotating speed mode and the working mode of the second driving servo motor 2 to the torque mode, and the load dynamometer controller 10 is used to set the working mode of the load dynamometer 9 to the torque mode.

Then, the first driving servo motor 1 is started to provide a certain speed, the second driving servo motor 2 is started, and the load dynamometer 9 is started to provide a certain torque. At this time, the tooth vibration simulation test system for the dual-machine drive gear transmission gear is operating normally. Since the second driving servo motor 2 has no given torque, the gear pair formed by the second main driving gear 6-5-1 in the second main driving shaft 6-5 and the third driven gear 6-4-1 on the second driven shaft 6-4 is in negative meshing state, and the gear pair formed by the fourth driven gear 6-4-2 on the second driven shaft 6-4 and the output gear 6-3-1 on the output shaft 6-3 is also in negative meshing state. The second driving servo motor 2 is driven to run and has no effective power input to the gear transmission device.

Furthermore, the second driving servo motor 2 is controlled by the servo motor controller 3 to gradually increase the torque, the gear pair formed by the second main driving gear 6-5-1 in the second main driving shaft 6-5 and the third driven gear 6-4-1 on the second driven shaft 6-4, and the gear pair formed by the fourth driven gear 6-4-2 on the second driven shaft 6-4 and the output gear 6-3-1 on the output shaft 6-3 are gradually changed from the negative meshing state to the positive meshing state. The second driving servo motor 2 gradually outputs effective power to the gear transmission device to complete the parallel operation of the second driving servo motor, and this process causes the teeth vibration.

Furthermore, the servo motor controller 3 can generate a torque sinusoidal fluctuation control signal, which can cause the second driving servo motor 2 to output a sinusoidal fluctuation torque, and the second driving torque sensor 5 can collect the actual torque fluctuation signal actually input by the second driving servo motor 2 into the gear transmission device 6, and can experimentally study the impact of the driving torque fluctuation on the tooth vibration of the dual-machine drive gear transmission device.

Finally, the load dynamometer controller 10 can generate a positive torque fluctuation control signal, which can cause the load dynamometer 9 to output a sinusoidal fluctuation torque, and the load torque sensor 8 can collect the torque fluctuation signal actually output by the load dynamometer 9, and can experimentally study the impact of the load torque fluctuation on the tooth vibration of the dual-machine drive gear transmission device.

What is claimed is:

1. A dual machine drive gear transmission device of a tooth vibration simulation test system, characterized in that: said simulation test system comprises a first driving unit, a second driving unit, a transmission shaft assembly, a servo motor controller (3), a gear transmission device (6), a loading shaft (7), a load dynamometer (9) and a load dynamometer control device (10), wherein said first driving unit and said second driving unit are arranged in parallel, a power output end of said first driving unit is connected to a first power input end of said gear transmission device (6) through a shaft coupling device, a power driving end of said first driving unit is connected to a first signal output terminal of said servo motor controller (3) through a connecting wire, a power output end of said second driving unit is connected to a second power input end of said gear transmission device (6) through a shaft coupling device, a power driving end of said second driving unit is connected to a second signal output terminal of said servo motor controller (3) through a connecting wire, and a power output end of said gear transmission device (6) is connected to one end of said loading shaft (7) through a shaft coupling device, another end of said loading shaft (7) is connected to a power input shaft of said load dynamometer (9) through said transmission shaft assembly, a signal input terminal of the load dynamometer (9) is connected to a signal output terminal of said load dynamometer controller (10) through a connecting wire, said transmission shaft assembly comprises a transmission shaft and a loading torque sensor (8), one end of said transmission shaft is detachably connected to another end of said loading shaft (7), and another end of said transmission shaft is detachably connected to a power input shaft in said load dynamometer (9), said loading torque sensor (8) is installed on said transmission shaft, and said loading torque sensor (8) is fixed on the ground through a supporting frame;

said gear transmission device (6) is internally provided with a first main driving shaft unit, a first driven shaft unit, a second main driving shaft unit, a second driven shaft unit and an output shaft unit, said first main driving shaft unit and said second main driving shaft unit are symmetrically arranged on two sides of said output shaft unit along an axis of said output shaft unit, said first driven shaft unit is arranged between said first main driving shaft unit and said output shaft unit, and said first main driving shaft unit is transmission connected to said output shaft unit through said first driven shaft unit, said second driven shaft unit is arranged between said second main driving shaft unit and said output shaft unit, and said second main driving shaft unit is transmission connected to said output shaft unit through said second driven shaft unit, another end of said first intermediate shaft is connected to said first main driving shaft unit in said gear transmission device (6) through a shaft coupling device, another end of said second intermediate shaft is connected to said second main driving shaft unit in said gear transmission device (6) through a shaft coupling device;

said first main driving shaft unit comprises a first main driving shaft (6-1) and a first main driving gear (6-1-1), said first main driving gear (6-1-1) is installed on said first main driving shaft (6-1), said first driven shaft unit comprises a first driven shaft (6-2), a first driven gear (6-2-1) and a second driven gear (6-2-2), said first driven gear (6-2-1) and said second driven gear (6-2-2) are both installed on said first driven shaft (6-2), and teeth of said first main driving gear (6-1-1) of said first driven gear (6-2-1) are arranged to mesh with each other, said output shaft unit comprises an output shaft (6-3) and an output gear (6-3-1), said output gear (6-3-1) is installed on said output shaft (6-3), and teeth of said second driven gear (6-2-2) are arranged to mesh with each other, said second driven shaft unit comprises a second driven shaft (6-4), a third driven gear (6-4-1) and a fourth driven gear (6-4-2), said third driven gear (6-4-1) and said fourth driven gear (6-4-2) are both installed on said second driven shaft (6-4), and teeth of said fourth driven gear (6-4-2) and said output gear (6-3-1) are arranged to mesh with each other, said second main driving shaft unit comprises a second main driving shaft (6-5) and a second main driving gear (6-5-1), said second main driving gear (6-5-1) is installed on said second main driving shaft (6-5), and teeth of said second main driving gear (6-5-1) and said third driven gear (6-4-1) are arranged to mesh with each other, another end of said first intermediate shaft is connected to said first main driving shaft (6-1) through a shaft coupling device, and another end of said second intermediate shaft is connected to said second driving shaft (6-5) through a shaft coupling device, wherein said first driving unit is configured to a rotating speed mode and said second driving unit is configured to a torque mode, during an operation of said system, firstly, said first driving unit is started and is given a preset speed, which drives said second driving unit and said load dynamometer (9) to run, at this time, a gear pair connected to said second driving unit are in a negative meshing state and no work is done on said gear transmission device (6) and the load; secondly, said second driving unit starts and gradually increases its motor output torque, and during this process, said gear pair connected to said second driving unit changes from the negative meshing state to a positive meshing state, and tooth vibration occurs; finally, said second driving unit continues to increase to a preset appropriate torque, and at this time, said first and said second driving units output an effective power and said beating tooth vibration disappears, said servo motor controller (3) provides driving torque fluctuation control for said second driving unit, and said load dynamometer controller (10) provides loading torque control for said load dynamometer (9) in order to realize an input torque fluctuation and a loading torque fluctuation of said tooth vibration simulation test system for said dual-machine drive gear transmission device.

2. The dual machine drive gear transmission device of a tooth vibration simulation test system according to claim 1, characterized in that: said first driving unit comprises a first driving servo motor (1), a first driving torque sensor (4) and a first intermediate shaft, said first driving servo motor (1) is fixed on a ground through a motor supporting frame, a motor output shaft of said first driving servo motor (1) is detachably connected to one end of said first intermediate shaft, another end of said first intermediate shaft is connected to a first power input end of said gear transmission device (6) through a shaft coupling device, said first driving torque sensor (4) is installed on said first intermediate shaft, and said first driving torque sensor (4) is fixed on the ground through a supporting frame.

3. The dual machine drive gear transmission device of a tooth vibration simulation test system according to claim 2, characterized in that, said second driving unit comprises a second driving servo motor (2), a second driving torque sensor (5) and a second intermediate shaft, said second driving servo motor (2) is fixed on the ground through a motor supporting frame, a motor output shaft of said second driving servo motor (2) is detachably connected to one end of said second intermediate shaft, another end of said second intermediate shaft is connected to a second power input end of said gear transmission device (6) through a shaft coupling device, said second driving torque sensor (5) is installed on said second intermediate shaft, and said second driving torque sensor (5) is fixed on the ground through a supporting frame.

\* \* \* \* \*